(12) United States Patent
Aktas et al.

(10) Patent No.: US 10,391,904 B2
(45) Date of Patent: Aug. 27, 2019

(54) INERTIA LATCH FOR A VEHICLE ARMREST USING A SPRING LOADED CAM

(71) Applicant: Ford Global Technologies, LLC, Dearborn, MI (US)

(72) Inventors: Macit Aktas, Windsor (CA); Joseph Michael Kish, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 15/259,604

(22) Filed: Sep. 8, 2016

(65) Prior Publication Data

US 2018/0065520 A1  Mar. 8, 2018

(51) Int. Cl.
*B60N 2/75* (2018.01)
*B60N 2/433* (2006.01)
*F16C 11/10* (2006.01)

(52) U.S. Cl.
CPC ............ *B60N 2/757* (2018.02); *B60N 2/433* (2013.01); *F16C 11/10* (2013.01)

(58) Field of Classification Search
CPC .......... B60N 2/757; B60N 2/433; F16C 11/10
USPC ......................................................... 297/117
See application file for complete search history.

(56) References Cited

U.S. PATENT DOCUMENTS

| | | |
|---|---|---|
| 4,579,384 A | 4/1986 | Sharod |
| 4,848,840 A | 7/1989 | Toya |
| 5,476,307 A | 12/1995 | Whalen |
| 5,658,043 A | 8/1997 | Davidson |
| 6,047,444 A | 4/2000 | Braun |
| 2007/0241603 A1 | 10/2007 | Otto |
| 2008/0138149 A1 | 6/2008 | Selbekk et al. |

*Primary Examiner* — Anthony D Barfield
(74) *Attorney, Agent, or Firm* — Vichit Chea; Price Heneveld LLP

(57) ABSTRACT

A vehicle seating assembly includes an armrest having a retention pin and operable about a first pivot. An inertial lock is operable about a second pivot to define an idle position defined by the inertial lock biased distal from the retention pin and a deployed position defined by an opposing directional force biasing the inertial lock into selective engagement with the retention pin and holding the armrest in a predetermined rotational position.

16 Claims, 11 Drawing Sheets

INERTIA LATCH FOR A VEHICLE ARMREST USING A SPRING LOADED CAM

FIELD OF THE INVENTION

The present invention generally relates to vehicle armrests, and more specifically, a lockable vehicle armrest that includes an inertia-activated cam.

BACKGROUND OF THE INVENTION

Typically, vehicles include armrests that can be disposed within various positions of seating within the passenger cabin. These armrests are rotatable from a vertical position at least partially within the vehicle seat and a horizontal position for defining a horizontal armrest surface. When the armrest is in the vertical position, this portion of the vehicle seat can be used for an additional seating position within the passenger cabin.

SUMMARY OF THE INVENTION

According to one aspect of the present invention, a vehicle seating assembly includes an armrest having a retention pin and is operable about a first pivot. An inertial lock is operable about a second pivot to define an idle position where the inertial lock is biased distal from the retention pin and a deployed position where an opposing directional force biases the inertial lock into selective engagement with the retention pin to hold the armrest in a predetermined rotational position.

According to another aspect of the present invention, a vehicle seating assembly includes an armrest operable through a guide slot defined in an armrest bracket between upright and downward positions. An inertial lock is operable between an idle position biased distal from the guide slot, and a deployed position defined by an opposing directional force biasing the inertial lock to intersect the guide slot to selectively prevent rotation of the armrest away from the upright position.

According to another aspect of the present invention, a method for operating a vehicle armrest includes coupling an armrest frame to an armrest bracket. The armrest frame is rotationally operable through a guide slot defined within the armrest bracket and the armrest frame is operable between upright and downward positions. The method also includes coupling a cover plate with the armrest bracket and positioning an inertial lock within a rotation space defined between the cover plate and the armrest bracket, wherein a biasing mechanism exerts a return biasing force that biases the inertial lock into an idle position distal from the guide slot. The method also includes applying an opposing directional force that opposes the return biasing force of the biasing mechanism. When the opposing directional force overcomes the return biasing force, the inertial lock rotates to a deployed position wherein the inertial lock blocks the armrest frame from operating through the guide slot away from the upright position. The method also includes removing the opposing directional force, wherein the inertial lock is biased by the return biasing force toward the idle position such that the armrest frame is operable between the upright and downward positions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
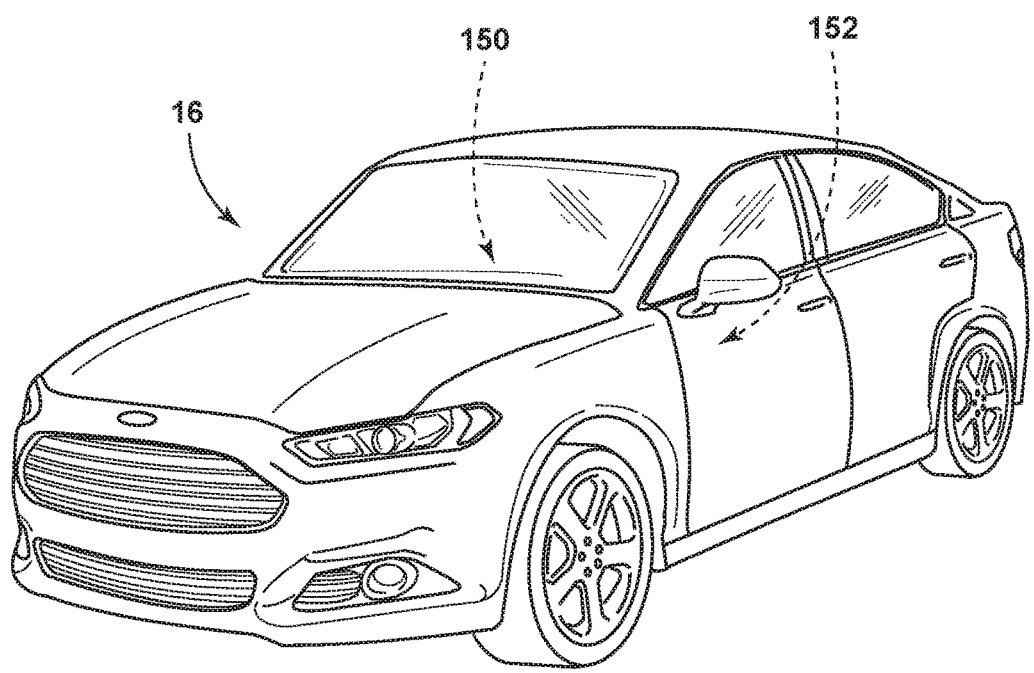
FIG. 1 is a front perspective view of a vehicle having an armrest that incorporates an aspect of the inertial lock.
Figure 2:
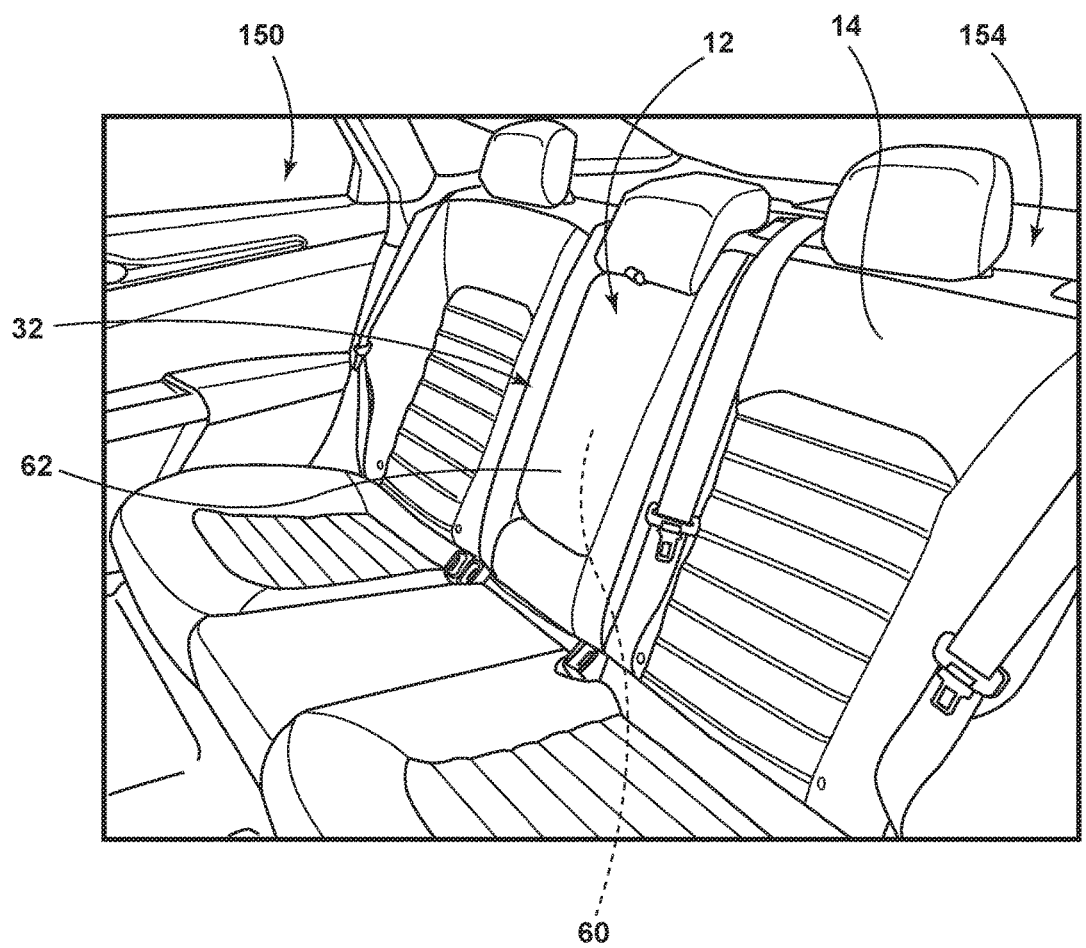
FIG. 2 is a side perspective view of the rear seat of the vehicle of FIG. 1 and illustrating the armrest in an upright position.
Figure 3:
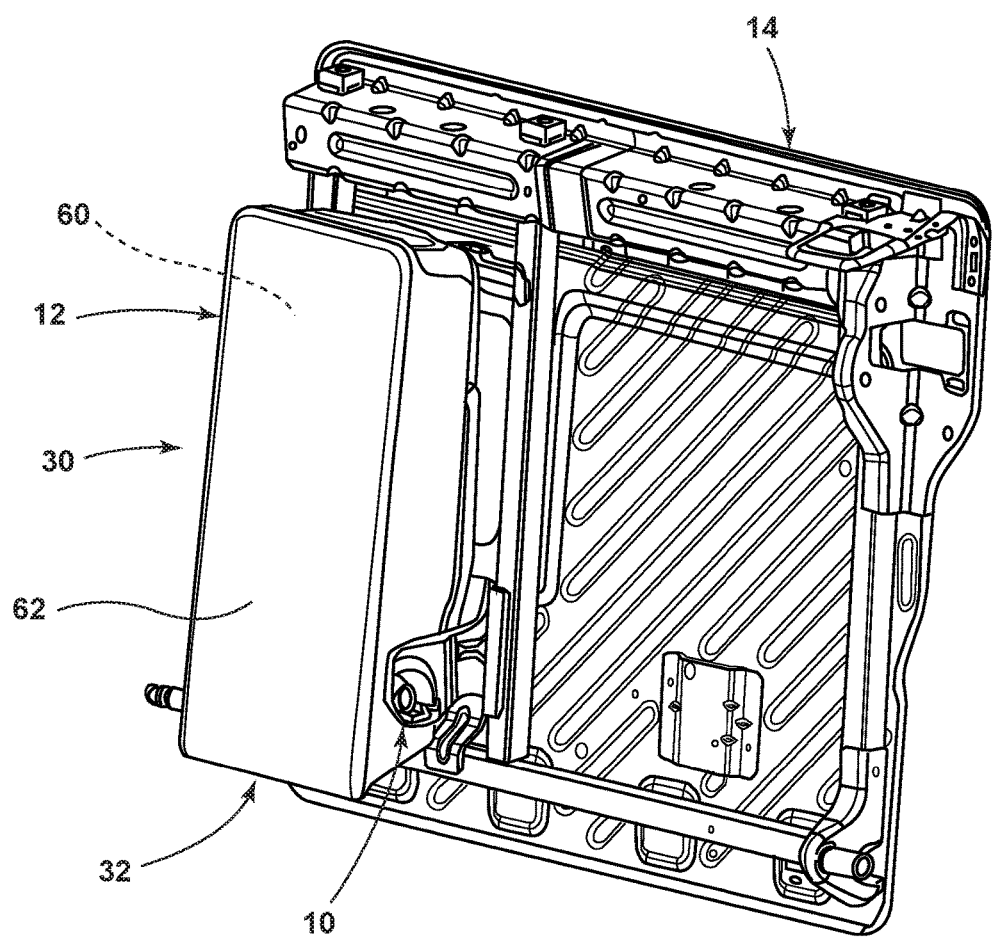
FIG. 3 is a partially exploded view of the vehicle seat of FIG. 2 with the outer cover and cushions removed and illustrating the armrest in the upright position.
Figure 4:
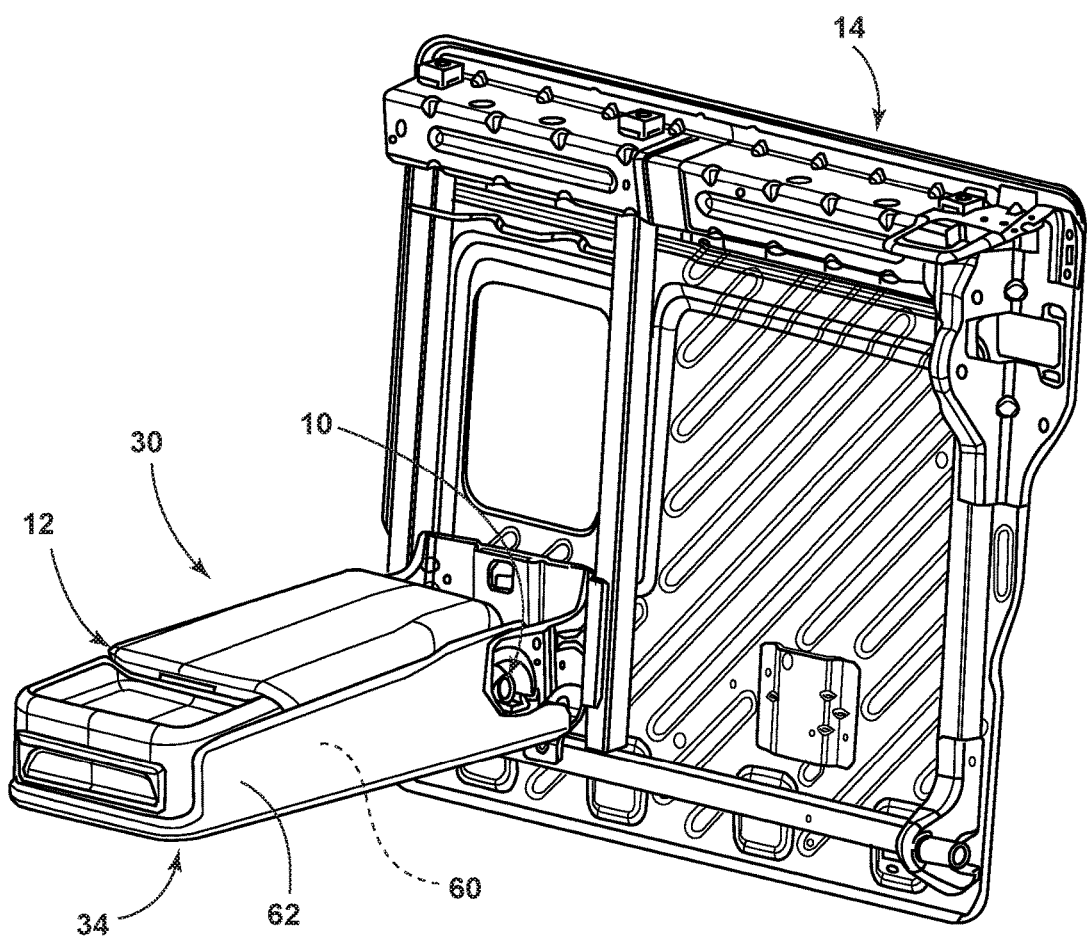
FIG. 4 is a partially exploded perspective view of the seat assembly of FIG. 3 with the armrest in a downward position.
Figure 5:
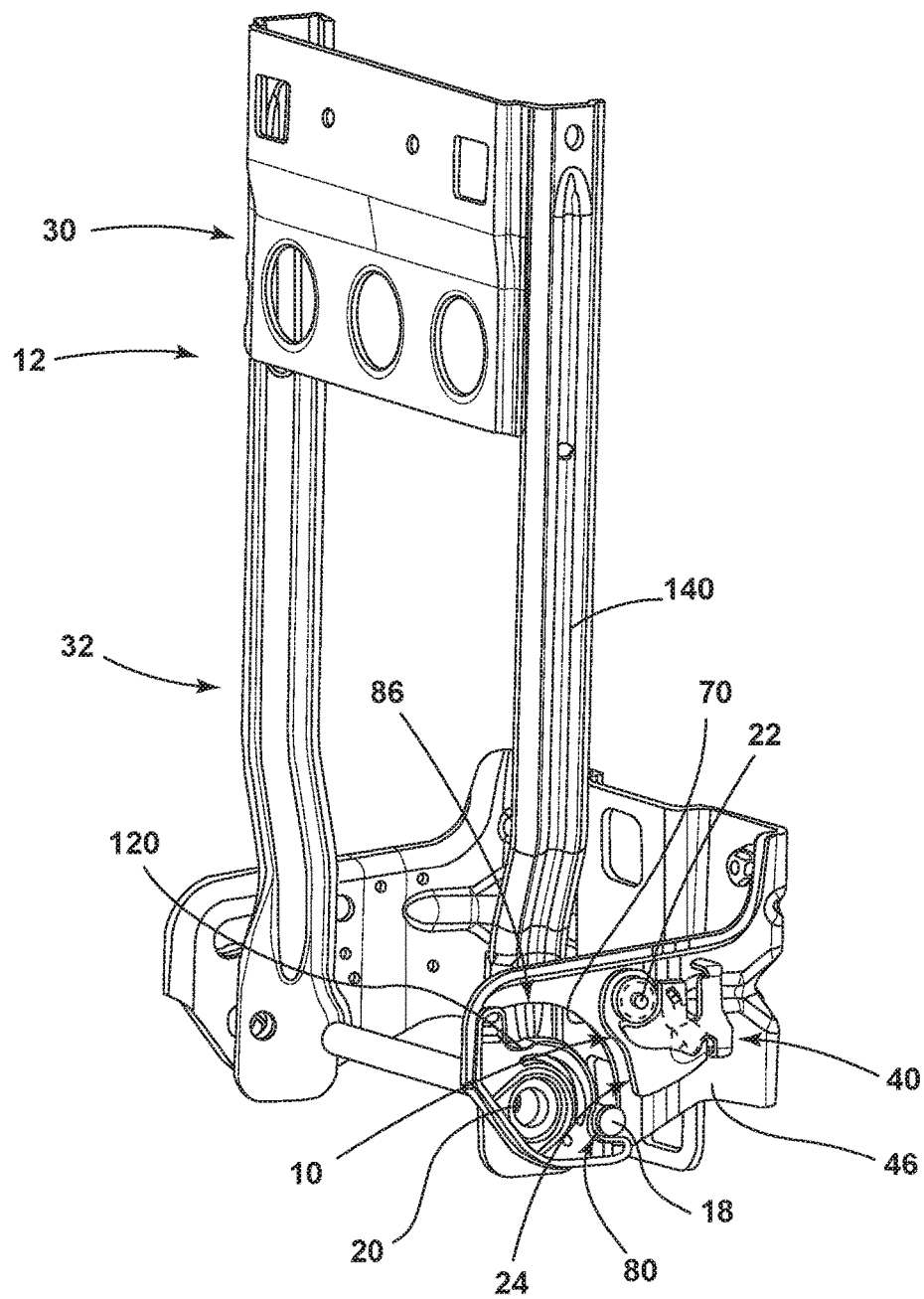
FIG. 5 is a side perspective view of an armrest frame and armrest bracket incorporating an aspect of the inertial lock.
Figures 6, 6A:
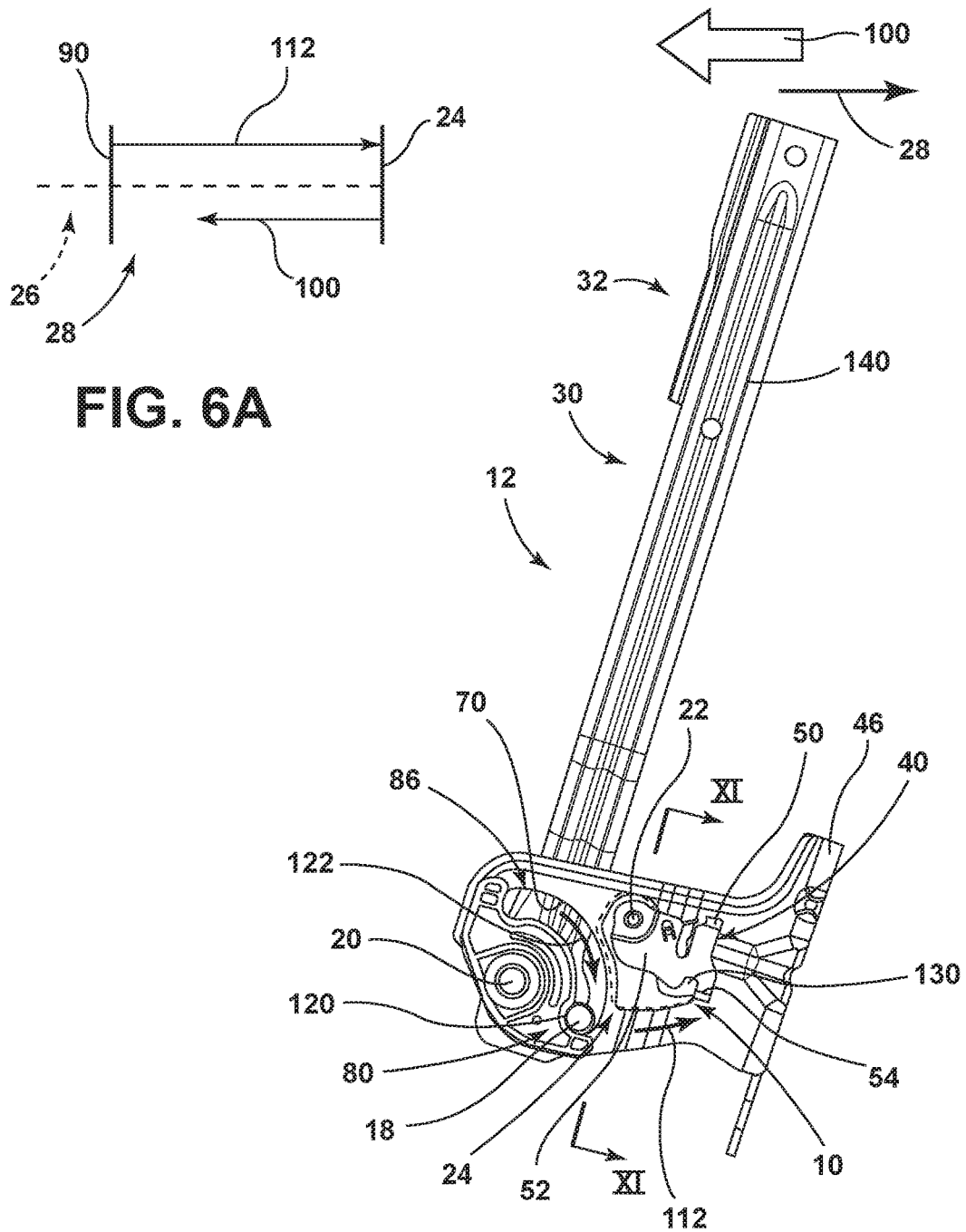
FIG. 6 is a side elevational view of the armrest frame and armrest bracket of FIG. 5.
FIG. 6A is a schematic diagram illustrating an opposing directional force that does not overcome the force threshold and retains the inertial lock in the idle position.
Figure 7:
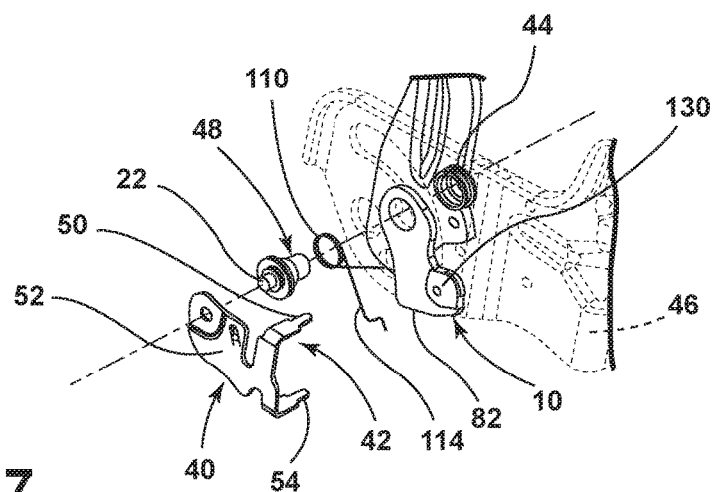
FIG. 7 is a partially exploded perspective view of the inertial lock of FIG. 5.
Figure 8:
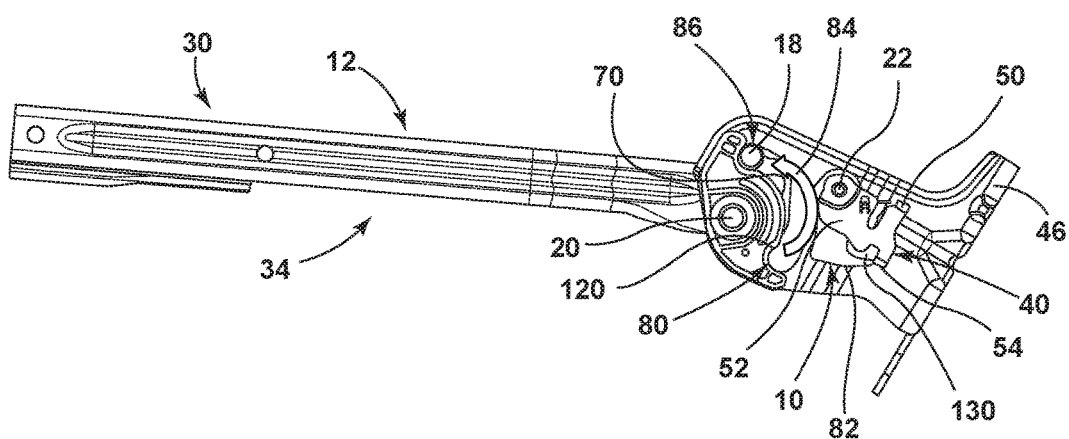
FIG. 8 is a side elevational view of the armrest of FIG. 6 showing the armrest in a downward position.
Figures 9, 9A:
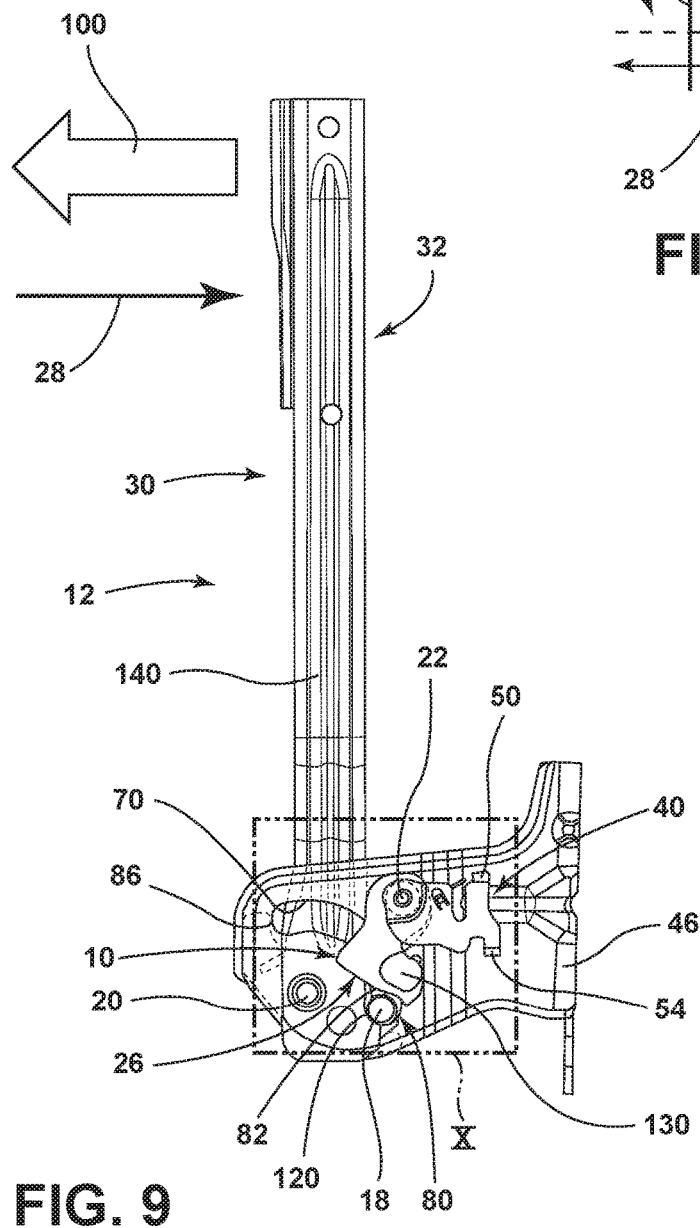
FIG. 9 is a side perspective view of the armrest of FIG. 6 showing the inertial lock in the deployed position.
FIG. 9A is a schematic diagram illustrating an opposing directional force that exceeds the force threshold and rotates the inertial lock into the deployed position.
Figure 10:
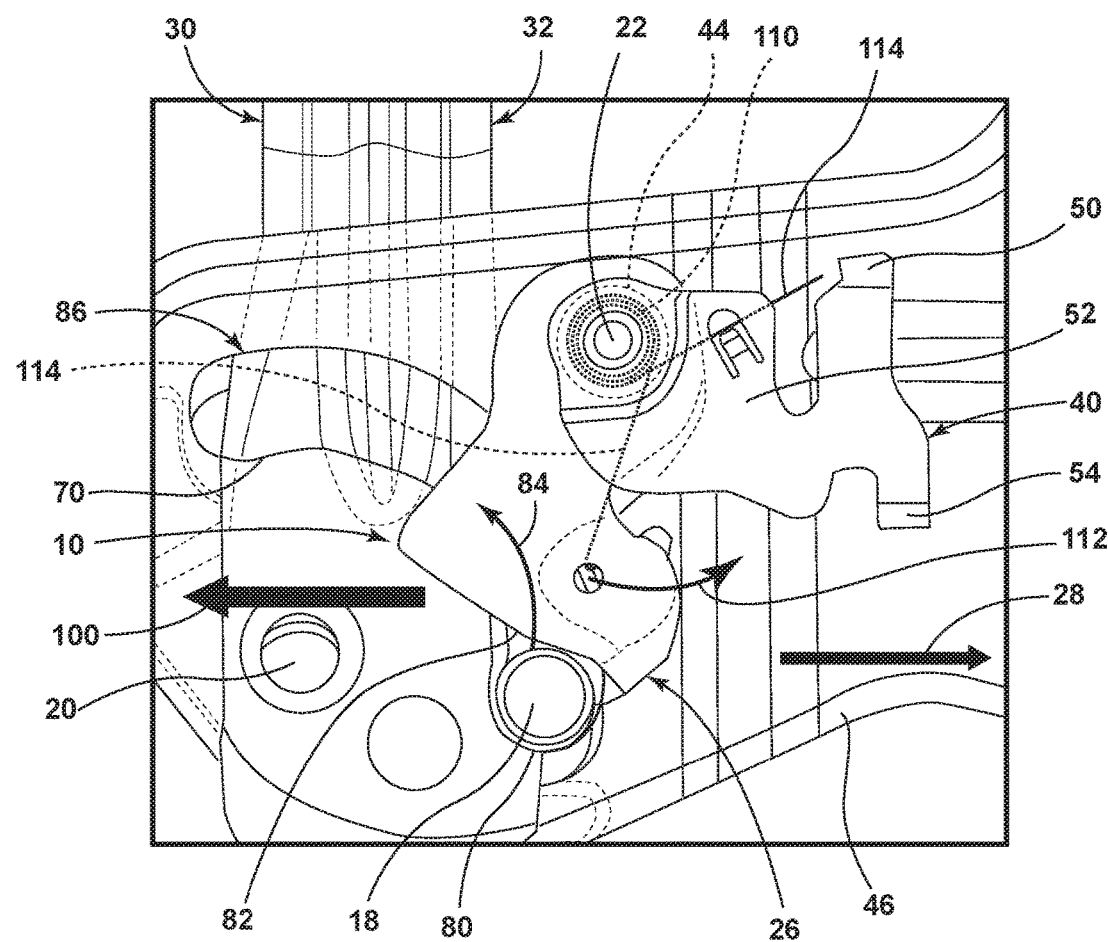
FIG. 10 is an enlarged elevational view of the inertial lock of FIG. 9, taken at area X.
Figure 11:
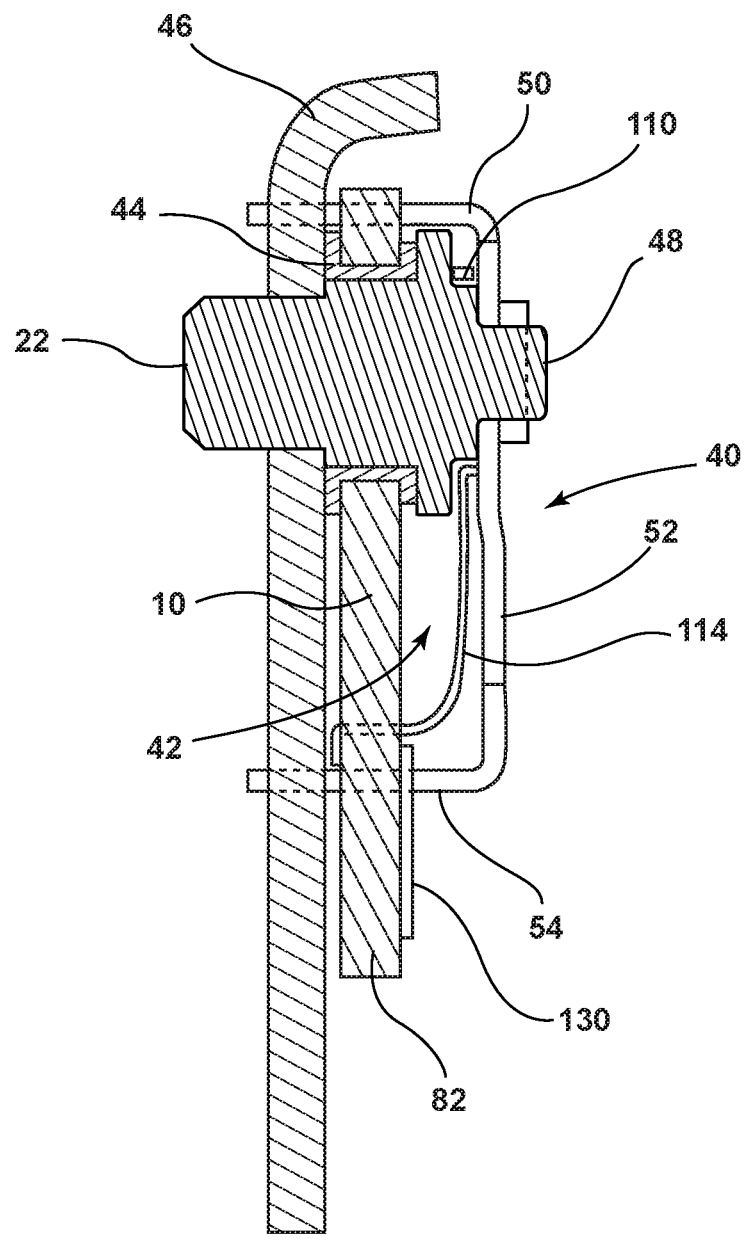
FIG. 11 is a cross-sectional view of the inertial lock of FIG. 6 taken along line XI-XI.
Figure 12:
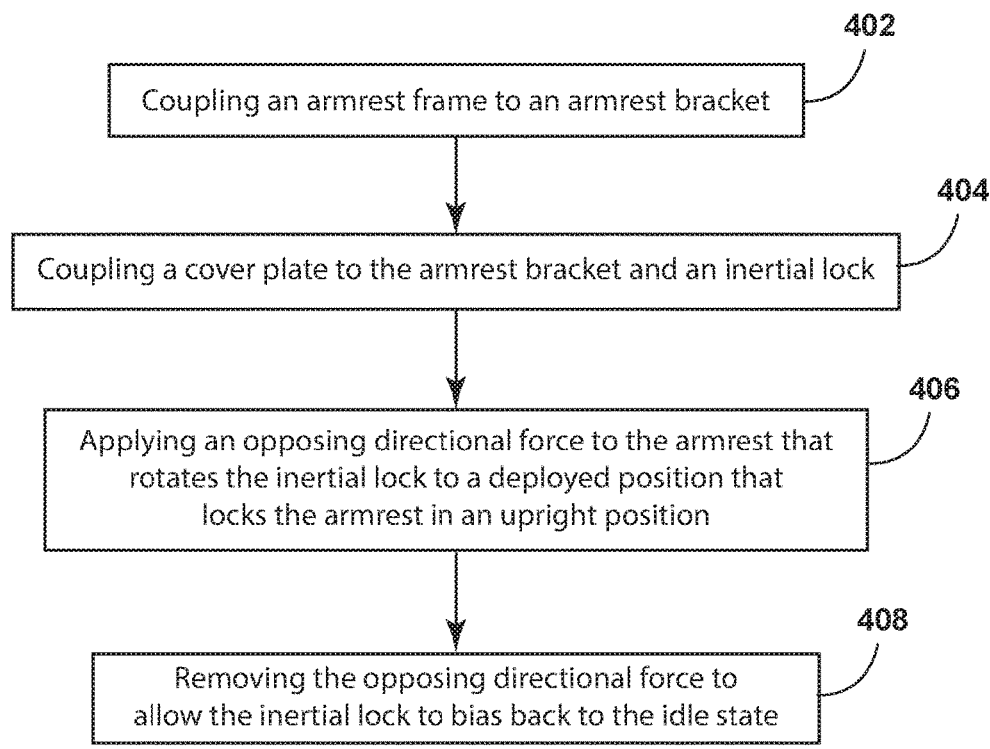
FIG. 12 is a schematic flow diagram illustrating a method for operating a vehicle armrest using an aspect of the inertial lock.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-11, reference numeral 10 generally refers to an inertial lock disposed within an armrest 12 of a seating assembly 14 of a vehicle 16. According to the various embodiments, the seating assembly 14 for the vehicle 16 can include an armrest 12 having a retention pin 18, where the armrest 12 is operable about a first pivot 20. The inertial lock 10 is positioned proximate the armrest 12 and is operable about a second pivot 22 to define an idle position 24. The idle position 24 can be defined by the inertial lock 10 being biased distal from the retention pin 18. The inertial lock 10 is operable about the second pivot 22 to further define a deployed position 26 defined by an opposing directional force 28 that results in a biasing of the inertial lock 10 into selective engagement with the retention pin 18. This selective engagement serves to hold the armrest 12 in a predetermined rotational position 30. According to the various embodiments, this predetermined rotational position 30 can be an upright position 30, a downward position 34, or other predetermined rotational position 30 therebetween.

Referring again to FIGS. 3-11, the seating assembly 14 for the vehicle 16 can also include a cover plate 40 that defines a rotation space 42 within which the inertial lock 10 rotates between the idle and deployed positions 24, 26. A bushing 44 is included proximate the cover plate 40 that serves to separate the inertial lock 10 from an armrest bracket 46 that couples the armrest 12 to the seating assembly 14. A pivot pin 48 is disposed proximate the cover plate 40 and the bushing 44 and defines the second pivot 22. According to the various embodiments, the pivot pin 48 can extend through the inertial lock 10, the cover plate 40 and the bushing 44. It is contemplated that the bushing 44 can include a washer-type member that allows for slidable engagement between the inertial lock 10 and the armrest bracket 46 and/or between the inertial lock 10 and the cover plate 40. Accordingly, when the opposing directional force 28 slows the vehicle 16 and the armrest 12 such that the inertia or momentum 100 of the inertial lock 10 biases the inertial lock 10 toward the deployed position 26, the bushing 44 serves to promote the rotational sliding engagement of the inertial lock 10 within the rotation space 42 defined by the cover plate 40.

Referring again to FIGS. 5-11, the cover plate 40 can include a pair of attachment legs 50 that extend from a main body 52 of the cover plate 40 to a portion of the armrest bracket 46. In this manner, the cover plate 40 is attached to the armrest bracket 46 via the attachment legs 50 of the cover plate 40 and the pivot pin 48. Additionally, the pivot pin 48 and attachment legs 50 of the cover plate 40 space the main body 52 of the cover plate 40 from the armrest bracket 46 to define the rotation space 42 within which the inertial lock 10 operates between the idle and deployed positions 24, 26. One of the attachment legs 50 of the cover plate 40 can define a blocking leg 54 that is attached to the armrest bracket 46 and is positioned to receive the inertial lock 10 in the idle position 24. Accordingly, the blocking leg 54 of the cover plate 40 defines the idle position 24 of the inertial lock 10 in the absence of the opposing directional force 28.

According to the various embodiments, as exemplified in FIGS. 5-11, the cover plate 40 is positioned to at least partially surround the inertial lock 10 in both the idle and deployed positions 24, 26. In this manner, the cover plate 40 substantially prevents interference from outside objects, such as a cushion member 60 and/or a cover member 62 of the armrest 12 or other portion of the seating assembly 14 that might prevent operation of the inertial lock 10 from operating between the idle and deployed positions 24, 26. By way of example, and not limitation, portions of the armrest 12 and/or portions of the seating assembly 14 may move toward the cover plate 40 and/or the inertial lock 10. The cover plate 40 at least partially separates the inertial lock 10 from these cushion and cover members 60, 62 to allow for substantially free operation of the inertial lock 10 between the idle and deployed positions 24, 26.

Referring again to FIGS. 3-11, the retention pin 18 of the armrest 12 can rotate through or operate within a guide slot 70 defined within the armrest bracket 46. In such an embodiment, as the armrest 12 rotates about the first pivot 20 to define the plurality of rotational positions 30 of the armrest 12, the retention pin 18 operates through, typically in a rotational manner, the guide slot 70. When the opposing directional force 28 is applied to the vehicle 16, the armrest 12, when in the upright position 30, will be biased by the momentum 100 of the armrest 12 in a generally forward direction and toward the downward position 34 of the armrest 12. Similarly, the inertial lock 10 is biased in a generally forward direction into an intersecting-type engagement with the path of travel of the retention pin 18 through the guide slot 70. Accordingly, when the inertial lock 10 is in the deployed position 26, the inertial lock 10 at least partially prevents movement of the retention pin 18 through the guide slot 70.

It is contemplated that the inertial lock 10 in the deployed position 26 can retain the armrest 12 in the upright position 30, the downward position 34, or in another preselected rotational position 30 therebetween. Typically, the inertial lock 10 prevents movement of the armrest 12 when the armrest 12 is in the upright position 30 and the retention pin 18 is in a lower portion 80 of the guide slot 70. When the inertial lock 10 moves to the deployed position 26, a blocking surface 82 of the inertial lock 10 engages the retention pin 18 and blocks movement of the retention pin 18 in an upward direction 84 through the guide slot 70 and toward an upper portion 86 of the guide slot 70. In this manner, the blocking surface 82 of the inertial lock 10 prevents downward rotation of the armrest 12 from the upright position 30 toward the downward position 34. The inertial lock 10 in the deployed position 26 continues to block movement of the armrest 12 from the upright position 30 to the downward position 34 so long as the opposing directional force 28 exceeds a force threshold 90. According to the various embodiments, this force threshold 90 can be approximately 2.5 times the force of gravity applied in a generally forward direction.

According to the various embodiments, the opposing directional force 28 applied to the vehicle 16 that biases the inertial lock 10 from the idle position 24 to the deployed position 26 can be exerted during a rapid deceleration of the vehicle 16. This rapid deceleration can be a sudden breaking maneuver performed by the driver, a generally frontal impact involving the vehicle 16, or other type of impact that may exert the opposing directional force 28 upon the vehicle 16. Stated another way, the opposing directional force 28 that acts on the vehicle 16, acts against the inertia or forward momentum 100 of the vehicle 16. As the vehicle 16 slows as a result of the opposing directional force 28, the inertia or momentum 100 of the armrest 12 and the inertial lock 10 cause the armrest 12 to tend toward the downward position 34. The momentum 100 or inertia of the inertial lock 10 tends to bias the inertial lock 10 toward the deployed position 26. Once in the deployed position 26, the inertial lock 10 prevents the rotational movement of the armrest 12 to the downward position 34 by blocking movement of the retention pin 18 through the guide slot 70.

Referring again to FIGS. 3-11, the inertial lock 10 is biased into the idle position 24 by a biasing mechanism disposed proximate the inertial lock 10 and the cover plate 40. The biasing mechanism can take the form of a biasing spring 110 such as a torsion spring that extends from the cover plate 40 to the inertial lock 10. The biasing spring 110 can be adapted to exert a return biasing force 112 that is generally concentric with the second pivot 22. Accordingly, the biasing spring 110 can at least partially extend around the second pivot 22 and can have opposing spring arms 114 that engage the inertial lock 10 and one of the cover plate 40 and the armrest bracket 46. The biasing spring 110 is designed to exert a certain magnitude of return biasing force 112 that tends the inertial lock 10 toward the idle position 24.

According to the various embodiments, the return biasing force 112 maintains the inertial lock 10 in the idle position 24 through application of the return biasing force 112. In the event of a sudden deceleration or generally frontal impact event, application of the opposing directional force 28, when in excess of the return biasing force 112, overcomes the return biasing force 112 and operates the inertial lock 10 to the deployed position 26. As discussed above, once the inertial lock 10 is in the deployed position 26, and the armrest 12 is in the upright position 30, the armrest 12 is blocked by the inertial lock 10 in the deployed position 26 from operating to the downward position 34 of the armrest 12. When the opposing directional force 28 is removed, application of the return biasing force 112 by the biasing spring 110 operates the inertial lock 10 back to the idle position 24 such that the inertial lock 10 no longer interferes with the operation of the retention pin 18 within the guide slot 70.

According to the various embodiments, as exemplified in FIGS. 5-10, the guide slot 70 can include one or more detent portions 120 that can at least partially retain the retention pin 18 and, in turn, the armrest 12 in the upright and downward positions 32, 34. Accordingly, a lower detent of the guide slot 70 can serve to partially retain the retention pin 18 and the armrest 12 in the upright position 30 when the opposing directional force 28 has a magnitude of less than the force threshold 90 noted above. Again, when the force threshold 90 is exceeded by the opposing directional force 28, the lower detent may be insufficient to retain the retention pin 18 within the upright position 30 such that the inertial lock 10 in the deployed position 26 is necessary to prevent operation of the armrest 12 from the upright position 30 to the downward position 34. The detent portions 120 can also serve to retain the retention pin 18 in the detent portion 20 and, in turn, retain the armrest 12 in the upright position 30 long enough to allow the inertial lock 10 to move into the deployed position 26. In this manner, when the opposing directional force 28 overcomes a retaining force 122 of the detent portion 120 and the detent portion 120 is about to release the retention pin 18, the inertial lock 10 has already moved into the deployed position 26 to maintain the armrest 12 in or possibly near the upright position 30.

Referring again to FIGS. 1-11, the seating assembly 14 for the vehicle 16 can include the armrest 12 that is operable through the guide slot 70 defined within the armrest bracket 46 between the upright and downward positions 32, 34. The inertial lock 10 is generally operable between the idle position 24 where the inertial lock 10 is biased distal from the guide slot 70. The inertial lock 10 is also operable to the deployed position 26 that is defined by the opposing directional force 28 biasing the inertial lock 10 to intersect the guide slot 70, or to intersect the path of travel of the retention pin 18 through the guide slot 70. In this manner, the inertial lock 10 in the deployed position 26 selectively prevents rotation of the armrest 12 away from the upright position 30. It is contemplated that the armrest 12 engages the armrest bracket 46 at the first pivot 20 and the guide slot 70 is typically concentric around the first pivot 20 such that the retention pin 18 also moves concentric with the first pivot 20 and through the guide slot 70.

Referring again to FIGS. 3-11, the cover plate 40 is adapted to engage the armrest bracket 46 to define the rotational space within which the inertial lock 10 rotates about the second pivot 22. As discussed above, the cover plate 40 at least partially covers and/or conceals the inertial lock 10 in both the idle and deployed positions 24, 26 to prevent interference from foreign objects with the operation of the inertial lock 10 between the idle and deployed positions 24, 26. The pivot pin 48 defines the second pivot 22 and extends through the cover plate 40 and the inertial lock 10. It is contemplated that the pivot pin 48 can also extend through the armrest bracket 46 or can be attached to a surface of the armrest bracket 46 proximate the bushing 44 that allows for slidable engagement between the armrest bracket 46 and the inertial lock 10. The biasing spring 110, which can be in the form of a torsion spring that applies the return biasing force 112, serves to bias the inertial lock 10 before the idle position 24. Where the biasing spring 110 is a torsion spring, the return biasing force 112 is typically applied radially and concentric with the second pivot 22.

According to the various embodiments, it is contemplated that the biasing spring 110 can be sized for minimizing noise emanating from the inertial lock 10 as it operates between the idle and deployed positions 24, 26. During typical operation of the vehicle 16, it is contemplated that typical braking operations may at least partially move the inertial lock 10 from the idle position 24, but not fully into the deployed position 26. Each time the this deceleration is completed, the inertial lock 10 will be returned to the idle position 24 through application of the return biasing force 112 exerted by the biasing spring 110. In order to minimize this noise, the torsion spring can be sized to provide for slow and/or controlled movement of the inertial lock 10 back to the idle position 24 to prevent or at least partially limit noise emanating from the engagement between the inertial lock 10 and the blocking leg 54 of the cover plate 40. Additionally, the inertial lock 10 and/or the blocking leg 54 can include a bumper member 130 that can be made of generally elastic or elastomeric material that serves to dampen the noise caused by engagement between the inertial lock 10 and the blocking leg 54 of the cover plate 40. Where a torsion spring is used as the biasing spring 110, the torsion spring can extend from the cover plate 40 to the inertial lock 10 or from the inertial lock 10 to the armrest bracket 46.

According to the various embodiments, as exemplified in FIGS. 3-11, the armrest 12 can include an armrest frame 140 that forms the structure of the armrest 12. A cushion member 60 as well as a cover member 62 of the armrest 12 can extend over the frame 140 of the armrest 12 to provide for the comfort of the occupant when the armrest 12 is in the upright and downward positions 32, 34. The frame 140 of the armrest 12 can include the retention pin 18 that serves to rotate through the guide slot 70 as the frame 140 rotates between the upright and downward positions 32, 34. It is contemplated that the movement of the inertial lock 10 to the deployed position 26 when the frame 140 of the armrest 12 is in the upright position 30 defines a direct engagement between the retention pin 18 and the inertial lock 10 to selectively retain the frame 140, and, in turn, the armrest 12, in the upright position 30. As discussed above, the application of the opposing directional force 28 biases the inertial lock 10 to the deployed position 26. Once the opposing directional force 28 is removed, the return biasing force 112 exerted by the biasing spring 110 returns the inertial lock 10 to the idle position 24 to allow for full operation of the armrest 12 between the upward and downward positions 32, 34.

Referring now to FIGS. 1-12, having described the various aspects of the inertial lock 10, a method 400 for operating an armrest 12 of a vehicle 16 is disclosed. According to the method 400, the frame 140 of the armrest 12 is coupled to the armrest bracket 46 (step 402). The frame 140 is rotationally operable through a guide slot 70 defined within the armrest bracket 46, such that the frame 140 of the armrest 12 is operable within the armrest bracket 46 between the upright and downward positions 32, 34. A cover plate 40 is coupled with the armrest bracket 46 and the inertial lock 10 is positioned within the rotation space 42 defined between the cover plate 40 and the armrest bracket 46 (step 404). The biasing spring 110 disposed within the rotation space 42 serves to exert a return biasing force 112 that biases the inertial lock 10 into an idle position 24, which is distal from the guide slot 70. During operation of the vehicle 16, an opposing directional force 28 can be applied to the vehicle 16 and, in turn, the armrest 12 of the vehicle 16 (step 406). The opposing directional force 28 opposes the return biasing force 112 of the biasing mechanism such that the opposing directional force 28 overcomes the return biasing force 112. The inertial lock 10 rotates in response to the opposing directional force 28 slowing the momentum 100 of the inertial lock 10. Accordingly, the inertial lock 10 rotates to a deployed position 26 where the inertial lock 10 blocks the armrest frame 140 from operation through the guide slot 70 away from the upright position 30. Eventually, the opposing directional force 28 is removed (step 408). The removal of the opposing directional force 28 can take place at the end of a deceleration, after the generally frontal impact, or after the sudden deceleration comes to an end and the car either decelerates to a lesser degree or stops decelerating altogether. Once the opposing directional force 28 is removed, or removed to such a degree that the return biasing force 112 overcomes the opposing directional force 28, the inertial lock 10 is biased by the biasing spring 110 toward the idle position 24 such that the frame 140 of the armrest 12 is operable between the upright and downward positions 32, 34.

As discussed above, the positioning of the cover plate 40 around at least a portion of the inertial lock 10 serves to at least partially prevent portions of the vehicle seating assembly 14, and portions of the armrest 12 from interfering with operation of the inertial lock 10 between the idle and deployed positions 24, 26. Additionally, use of the biasing spring 110 serves to allow for gentle and controlled movement of the inertial lock 10 from the idle position 24 and toward the deployed position 26 and also back toward the idle position 24 to minimize noise emanating from engagement of the inertial lock 10 with a portion of the cover plate 40.

According to the various embodiments, the biasing force threshold 90 necessary to be exerted by application of the opposing directional force 28 to overcome the return biasing force 112 and move the inertial lock 10 to the deployed position 26 can vary. The threshold of 2.5 times the force of gravity has been stated above, and it has been stated that the biasing threshold can be in the range of approximately 1.5 times the force of gravity and up to three times the force of gravity. Additionally, the biasing force threshold 90 is defined as the amount of opposing directional force 28 to place the inertial lock 10 in the deployed position 26. Lesser degrees of the opposing directional force 28 below the biasing threshold may operate the inertial lock 10 away from the idle position 24 toward, but not into, the deployed position 26. The biasing spring 110 is adapted to minimize noise emanating from the inertial lock 10 as it moves between the idle and deployed positions 24, 26 and engages the retention pin 18 and/or portions of the cover member 62 and/or portions of the armrest bracket 46. Accordingly, to minimize noise, the biasing spring 110 can allow for controlled movement of the inertial lock 10 that provides a soft and controlled engagement between the inertial lock 10 and the blocking leg 54 of the cover member 62. Initially, the inertial lock 10 can be made of plastic, or an elastic material, or can include plastic or elastic portions that dampen noise that may result from the engagement of the inertial lock 10 with the cover member 62 and/or the retention pin 18. According to the various embodiments, it is contemplated that the return biasing force 112 can be exerted through various biasing mechanisms that can include, but are not limited to, elastic members, compressible members, various types of springs and other biasing mechanisms that can exert the return biasing force 112 on the inertial lock 10.

According to the various embodiments, the inertial lock 10 can be incorporated into armrests 12 disposed in various locations within the passenger cabin 150 of the vehicle 16. Accordingly, the inertial lock 10 can be included in an armrest 12 within a front row seating 152 of a vehicle 16, within the rear seat 154 of the vehicle 16, or within a third row section of seating within the passenger cabin 150 of the vehicle 16.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly comprising:
   an armrest having a retention pin and operable about a first pivot;
   an inertial lock operable about a second pivot to define an idle position defined by the inertial lock biased distal from the retention pin, and a deployed position defined by an opposing directional force biasing the inertial lock into selective engagement with the retention pin and holding the armrest in a predetermined rotational position;
   a cover plate that defines a rotation space within which the inertial lock rotates between the idle and deployed positions, wherein the cover plate at least partially conceals the inertial lock in each of the idle and deployed positions;
   a bushing that separates the inertial lock from an armrest bracket; and
   a pivot pin that defines the second pivot and extends through the inertial lock, the cover plate and the bushing.

2. The vehicle seating assembly of claim 1, wherein the inertial lock is biased into the idle position by a biasing mechanism disposed proximate the inertial lock and the cover plate.

3. The vehicle seating assembly of claim 1, wherein the predetermined rotational position is an upright position of the armrest, wherein the deployed position of the inertial lock prevents rotation of the armrest out of the upright position until the opposing directional force is removed.

4. The vehicle seating assembly of claim 3, wherein the retention pin rotates through a guide slot as the armrest rotates about the first pivot to define a plurality of armrest positions, wherein the upright position is one of the plurality of armrest positions.

5. The vehicle seating assembly of claim 4, wherein the inertial lock in the deployed position extends over a portion of the guide slot and retains the retention pin in the upright position.

6. The vehicle seating assembly of claim 1, wherein the opposing directional force is defined by a deceleration of the armrest of approximately 2.5 times the force of gravity.

7. The vehicle seating assembly of claim 1, wherein a biasing spring biases the inertial lock toward the idle position, and wherein the biasing spring exerts a return biasing force that is concentric with the second pivot.

8. The vehicle seating assembly of claim 7, wherein when the opposing directional force is removed, the return biasing force returns the inertial lock to the idle position.

9. The vehicle seating assembly of claim 1, wherein the cover plate defines a blocking leg that receives the inertial lock in the idle position.

10. A vehicle seating assembly comprising:
an armrest operable through a guide slot in an armrest bracket between upright and downward positions;
an inertial lock operable between an idle position biased distal from the guide slot, and a deployed position defined by an opposing directional force biasing the inertial lock to intersect the guide slot to selectively prevent rotation of the armrest away from the upright position wherein the armrest engages the armrest bracket at a first pivot, and wherein the guide slot is concentric with the first pivot;
a cover plate that engages the armrest bracket to define a rotational space within which the inertial lock rotates about a second pivot, wherein the cover plate at least partially covers the inertial lock in both the idle and deployed positions;
a pivot pin that defines the second pivot and extends through the cover plate and the inertial lock; and
a torsion spring that applies a return biasing force to bias the inertial lock toward the idle position, wherein the return biasing force is applied radially and concentric with the second pivot.

11. The vehicle seating assembly of claim 10, wherein the torsion spring extends from the cover plate to the inertial lock.

12. The vehicle seating assembly of claim 10, wherein the cover plate defines a blocking leg that attaches to the armrest bracket and receives the inertial lock to define the idle position.

13. The vehicle seating assembly of claim 10, wherein the armrest includes a retention pin that rotates through the guide slot as the armrest rotates between the upright and downward positions, wherein movement of the inertial lock to the deployed position when the armrest is in the upright position defines a direct engagement between the retention pin and the inertial lock to selectively retain the armrest in the upright position.

14. A method for operating a vehicle armrest comprising steps of:
coupling an armrest frame to an armrest bracket, the armrest frame being rotationally operable through a guide slot defined within the armrest bracket, the armrest frame operable between upright and downward positions;
coupling a cover plate with the armrest bracket and positioning an inertial lock within a rotation space defined between the cover plate and the armrest bracket, wherein a torsion spring exerts a return biasing force that biases the inertial lock into an idle position distal from the guide slot;
applying an opposing directional force that opposes the return biasing force of the torsion spring, wherein when the opposing directional force overcomes the return biasing force, the inertial lock rotates to a deployed position wherein the inertial lock blocks the armrest frame from operating through the guide slot away from the upright position; and
removing the opposing directional force, wherein the inertial lock is biased by the return biasing force toward the idle position such that the armrest frame is freely operable between the upright and downward positions.

15. The method of claim 14, wherein the cover plate at least partially conceals the inertial lock in each of the idle and deployed positions, wherein the cover plate is adapted to at least partially prevent portions of a vehicle seat from interfering with operation of the inertial lock between the idle and deployed positions.

16. The method of claim 14, wherein the opposing directional force is defined by a deceleration of the armrest bracket, the deceleration along a magnitude of approximately 2.5 times the force of gravity.

* * * * *